United States Patent
Grace et al.

[11] Patent Number: 6,062,143
[45] Date of Patent: May 16, 2000

[54] DISTRIBUTED CHARGE INFLATOR SYSTEM

[75] Inventors: Gregory B. Grace, Mesa; Paul G. Apen, Scottsdale; Gershon Yaniv, Scottsdale; Joseph W. Coltman, Scottsdale; Marvin K. Richards, Gilbert, all of Ariz.

[73] Assignee: Simula, Inc., Phoenix, Ariz.

[21] Appl. No.: 09/149,630

[22] Filed: Sep. 8, 1998

Related U.S. Application Data

[60] Provisional application No. 60/058,202, Sep. 8, 1997.

[51] Int. Cl.[7] .................................................. C06D 5/00
[52] U.S. Cl. .............................. 102/530; 149/22; 149/36; 280/729; 280/736; 280/741
[58] Field of Search ................ 149/22, 36; 280/737, 280/736, 729, 728.2, 728.1, 742, 740, 741; 441/40; 244/98, 31; 102/530, 531

[56] References Cited

U.S. PATENT DOCUMENTS

| | | | |
|---|---|---|---|
| 3,532,359 | 10/1970 | Teague et al. | 280/150 |
| 3,606,377 | 9/1971 | Martin | 280/150 |
| 3,776,570 | 12/1973 | Weman | 280/15 |
| 4,139,404 | 2/1979 | Goddard et al. | 149/19.2 |
| 4,164,513 | 8/1979 | Goddard | 260/564 |
| 4,200,615 | 4/1980 | Hamilton et al. | 422/166 |
| 4,722,551 | 2/1988 | Adams | 280/736 |
| 4,923,212 | 5/1990 | Cuevas | 280/736 |
| 4,950,458 | 8/1990 | Cunningham | 422/164 |
| 5,101,729 | 4/1992 | Noble et al. | 102/275.8 |
| 5,125,684 | 6/1992 | Cartwright | 280/736 |
| 5,131,680 | 7/1992 | Coultas et al. | 280/737 |
| 5,282,648 | 2/1994 | Peterson et al. | 280/733 |
| 5,322,322 | 6/1994 | Bark et al. | 280/730 |
| 5,358,273 | 10/1994 | Onishi et al. | 280/743 |
| 5,403,035 | 4/1995 | Hamilton | 280/736 |
| 5,406,889 | 4/1995 | Letendre et al. | 102/201 |
| 5,415,932 | 5/1995 | Bishop et al. | 428/335 |
| 5,443,286 | 8/1995 | Cunningham et al. | 280/741 |
| 5,462,307 | 10/1995 | Webber et al. | 280/737 |
| 5,464,246 | 11/1995 | Castro et al. | 280/730.2 |
| 5,480,181 | 1/1996 | Bark et al. | 280/730.2 |
| 5,483,896 | 1/1996 | Hock et al. | 102/530 |
| 5,496,062 | 3/1996 | Rink et al. | 280/737 |
| 5,520,413 | 5/1996 | Mossi et al. | 280/729 |
| 5,588,676 | 12/1996 | Clark et al. | 280/741 |
| 5,613,706 | 3/1997 | Parker et al. | 280/741 |
| 5,623,115 | 4/1997 | Lauritzen et al. | 280/737 |
| 5,660,412 | 8/1997 | Renfroe et al. | 102/288 |
| 5,670,738 | 9/1997 | Storey et al. | 102/530 |
| 5,738,374 | 4/1998 | Marsaud et al. | 280/741 |
| 5,752,717 | 5/1998 | Galbraith et al. | 280/743.1 |
| 5,829,779 | 11/1998 | Nakashima et al. | 280/730.2 |
| 5,927,748 | 7/1999 | O'Driscoll | 280/729 |

*Primary Examiner*—Charles T. Jordan
*Assistant Examiner*—Aileen J. Baker
*Attorney, Agent, or Firm*—Crowell & Moring LLP

[57] ABSTRACT

An inflatable system which uses a fast-burning propellant material distributed within the inflatable component of the system to generate the gas inflating the system. The invention preferably includes a distributed fast-burning igniter material, which may be enhanced with additional gas-generating materials to increase the quantities of gas generated, an optional layer, coating, or sheath of supplemental gas-generating material, an environmentally-sealed sheath to protect the enclosed materials from contamination and to improve the burn rates and efficiencies of the propellant and ignition materials, and an electronic squib used to actuate the igniter material upon a signal from the electronic sensor.

48 Claims, 8 Drawing Sheets

DISTRIBUTED CHARGE INFLATOR SYSTEM

This application claims the benefit of the filing date of provisional patent application Ser. No. 60/058,202, filed on Sep. 8, 1997.

BACKGROUND

1. Field of the Invention

The present invention relates generally to the field of solid-fuel gas-generating devices for inflatable systems, and particularly to those used in inflatable restraint systems.

2. Background of the Invention

Prior art inflatable systems typically use an initiator (such as an electronic squib) and a booster material (such as boron potassium nitrate) to ignite a surrounding, much larger quantity of gas-generating propellant material (such as sodium azide, potassium nitrate or ammonium nitrate, and binders) formed into wafers, discs, pellets, or granules. The gas-generating propellant serves as the primary means by which sufficient gas is produced to deploy the inflatable system. The initiator, the booster material, and the surrounding gas-generating propellant are typically all confined within a metallic structure or assembly, the whole of which forms the "gas generator" which produces inflating gas for an inflatable component (such as an air bag in a passenger vehicle).

This gas generator assembly typically contains one or more internal chambers or baffles, as well as one or more internal sets of filters, which are designed to: (a) control the burn rate of the propellant and the gas mass flow rate, (b) reduce the temperature of the gases produced by the burning of the gas-generating material, and (c) filter out accelerated particles before the gases pass through vents in the assembly and into the airbag itself.

The gas generator is typically located in a position external to the inflatable component (e.g. an airbag) itself, and is attached to the inflatable component by a conduit through which the generated gases flow into the inflatable component, causing the inflatable component to deploy.

Such prior art systems are disclosed, for example, in U.S. Pat. No. 5,738,374 (a pyrotechnic gas generator for an air bag using an annular charge of a mixture of ammonium perchlorate and sodium nitrate, with a silicone binder); U.S. Pat. No. 5,623,115 (a gas generator including a pyrogen igniter enclosing a unitary grain of ignition material, with a squib located to ignite the unitary grain); U.S. Pat. No. 5,483,896 (a housing for a pyrotechnic inflator which serves as a filter for entrapping contaminants and as a cooler by absorbing heat from the generated gas); U.S. Pat. No. 5,443,286 (a gas generating cartridge surrounded by filtering and cooling screens); U.S. Pat. No. 4,200,615 (a linear ignitor and pyrotechnic material extending longitudinally within an elongated enclosure); U.S. Pat. No. 4,950,458 (a two-stage gas generator, in which each stage includes a combustion chamber with an igniter); and U.S. Pat. No. 4,923,212 (a lightweight pyrotechnic inflator consisting of six component parts, including mechanical parts, a filter, a propellant assembly and an initiator).

Hybrid inflators such as the inflators disclosed in U.S. Pat. No. 5,670,738 (a hybrid inflator using compressed gas together with an initiator and a pyrotechnic gas generator), U.S. Pat. No. 5,660,412 (a hybrid inflator consisting of a pressure vessel containing a main charge of pyrotechnic material and a secondary charge of pyrotechnic material, wherein the secondary charge produces products of combustion that ignite the main charge), U.S. Pat. No. 5,588,676 (a hybrid inflator with a pyrotechnic gas generator and a gas chamber storing pressurized gas), U.S. Pat. No. 5,462,307 (a hybrid air bag inflator with a first chamber containing compressed gas and a second chamber containing an igniter and pyrotechnic material) and U.S. Pat. No. 5,131,680 (an inflator assembly which includes pyrotechnic material and a container of gas under pressure) also use gas generating units that are completely separate from and external to the inflatable component (e.g., the air bag) itself.

Example of inflatable components which the present invention can be used to inflate are described in U.S. Pat. No. 5,282,648 (body and head restraints); U.S. Pat. No. 5,322,322 (side impact head strike protection); U.S. Pat. No. 5,480,181 (side impact head strike protection) and U.S. Pat. No. 5,464,246 (tubular cushions), which are all incorporated herein by reference, as well as automotive air bags and other inflatable products.

SUMMARY OF THE INVENTION

The present invention is an inflator system that can be used in conjunction with a wide variety of inflatable systems such as inflatable restraint systems, inflatable flotation systems, or passive inflatable safety systems. The inflator uses a fast-burning propellant material distributed within the inflatable component itself to generate the gas that inflates the system. The invention generally includes a distributed gas-generating material, that may have a faster burning center core ignition material surrounded by supplemental propellant, or uses a homogenous mixture of ignition material and propellant, and also includes an initiator (e.g., an electronic squib) used to ignite the gas generating material upon a signal from an initiating device. In a preferred embodiment of the invention, an environmentally-sealed sheath is used to protect the enclosed materials from contamination and/or to improve the burn rates and efficiencies of the propellant and ignition materials.

The fast burning gas generating material or "distributed charge" is designed to be installed within and distributed along the interior of the undeployed inflatable component (e.g., an airbag) itself. It is not necessary to contain the distributed charge inflator (DCI) within any type of exterior housing or assembly. The present invention is simpler and less expensive to manufacture than the prior art systems listed above, because it does not require the complicated series of chambers, baffles, or filters required by the prior art systems listed above.

The inflator is typically activated by an electronic sensor (for example, by an electronic crash sensor when the inflatable component is an air bag or other safety equipment which must be deployed in the event of a crash). However, the inflator may also be activated, for example, by another type of automatic device, or it may be activated by a mechanical device such as a button or switch or handle which is pushed, switched or pulled, respectively, by a user to deploy the inflatable component. For example, deployment of a life raft may be activated automatically by a sensor detecting immersion of the life raft in water, or it may be activated by a user pulling a handle. The device (crash sensor, mechanical device, button, switch, handle, water sensor or other device) that activates the inflation of the system will be referred to herein as the "activator."

For many applications, the present invention is superior to the prior art inflatable systems listed above. Because the distributed charge inflator is distributed, rather than confined to a small enclosed container as in the prior art systems listed above, it generates gases and releases the generated gases with far less explosive force than in the prior art systems. The internal DCI system virtually eliminates the uneven inflations, pressure waves, and inertial effects of gases injected into the inflatable components from externally-located gas generators. Moreover, the DCI-equipped inflatable restraints deploy less aggressively than existing systems because the energy of the expanding gases is essentially distributed uniformly throughout the inflatable structure during deployment.

Also, because the DCI is distributed internally within the inflatable component, there is no necessity to reinforce the inflatable fabric or bladder material against pressure, heat and high velocity particulates at the point at which gases would have been forcefully injected into the inflatable component from the gas generator external to the inflatable component. Furthermore, there is no need for a reinforced fill tube, or other means for providing a secure conduit from the gas generator to the inflatable component.

An additional advantage of the present invention is that it can be readily scaled to the particular application. Almost every different vehicle platform or different application requires different characteristics of the inflating system, e.g., a different volume of the inflating gas, or different rate of inflation. These issues are readily addressed with the present invention, simply because the charge is distributed within the inflatable component. For example, using the invention of U.S. Pat. No. 5,322,322 in a vehicle with a longer passenger compartment simply requires increasing the length of the inflatable component: this automatically increases the amount of distributed charge within the inflatable component. Furthermore, unlike conventional externally-inflated systems, the issue of whether the inflation rate need to be increased (so that the entire inflatable component inflates in time) simply does not arise—it is automatically addressed by the present invention.

DETAILED DESCRIPTION OF PREFERRED EMBODIMENTS OF THE INVENTION

Figure 1:
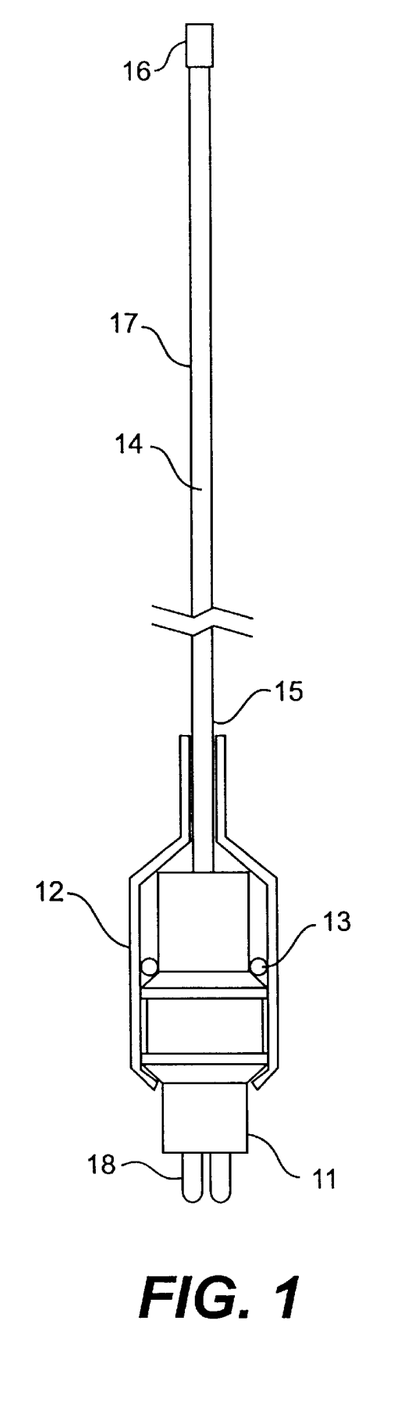
FIG. 1 is a schematic diagram of the distributed charge assembly of the present invention.

FIG. 1 is a schematic diagram of the distributed charge assembly, showing the distributed charge 14, the sheath 17, and the initiator 11. FIG. 1 also shows a housing 12 for the initiator, connector pins 18 used to electrically connect the initiator to the activator (e.g., a crash sensor), seal 13, seal 15 and end cap seal 16. These seals can be in the form of o-ring, gaskets or other appropriate forms which serve to seal the assembly against moisture and contamination. Typical seal materials may be used, such as rubber, RTV and/or metals.

When the crash sensor or other activator determines that the inflatable component must be deployed, it sends an electric signal through connector pins 18 to initiator 11, igniting initiator 11. Initiator 11 then starts the deflagration of distributed charge 14, generating inflating gas, and deployment of inflatable component 3 (shown in FIG. 1a). Initiator 11 may include or consist of an electronic squib, such as the electronic squibs used to initiate deployment of an automotive air bag.

Figure 1A:
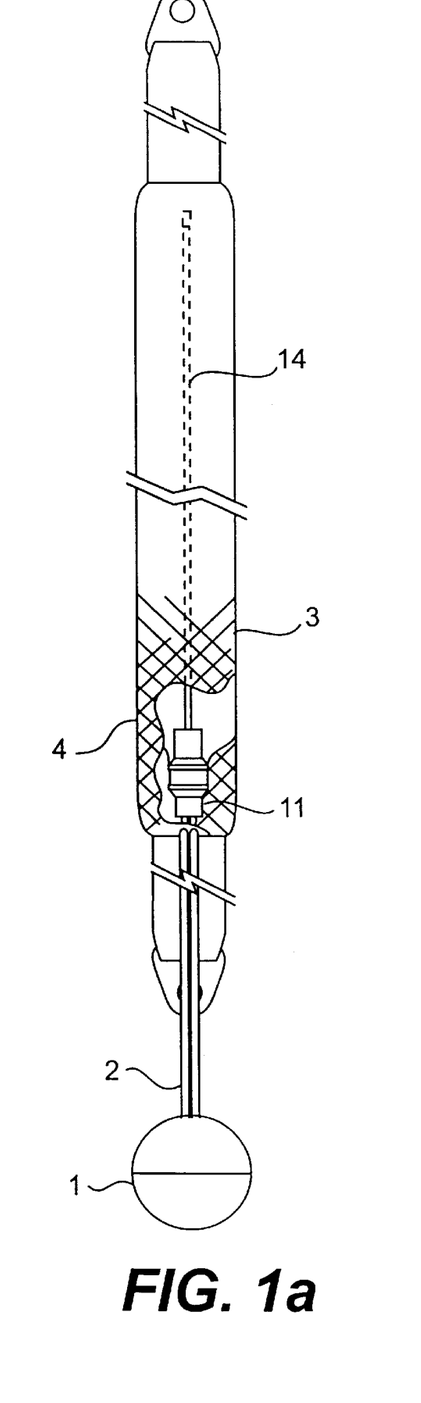
FIG. 1a is a schematic diagram of the present invention installed in an inflatable system.

FIG. 1a is a schematic diagram of the distributed charge inflator of the present invention installed within an inflatable system. Upon receiving an electrical signal from activator 1 along wires 2, igniter 11 ignites distributed charge 14 and inflates inflatable component 3 of inflatable system 4.

Figure 2:
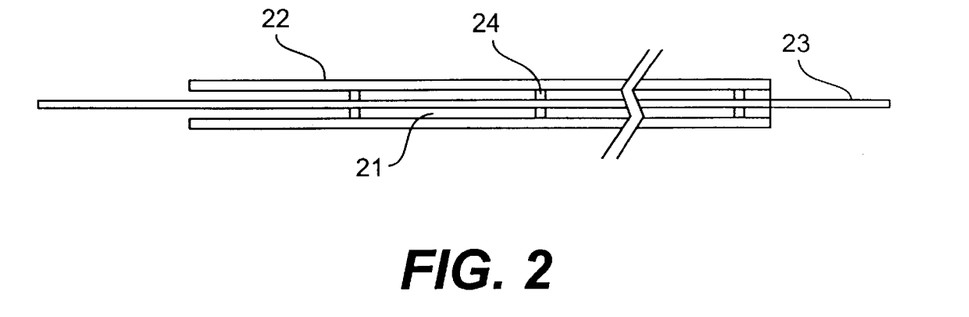
FIG. 2 is a schematic diagram of a distributed charge with the optional supplemental gas-generating layer.

As shown in FIG. 2, an optional gas-generating layer can be used to supply additional inflating gas. This optional layer (or coating) vaporizes and/or burns depending upon its composition and configuration. The optional layer or coating can be composed of liquid or solid components in a coating or an encapsulated layer, and can include a variety of fuels, oxidizers, additives and other materials that produce inflating gas. The optional layer or coating vaporizes or burns depending upon its chemical composition, and whether the components in the layer or coating support combustion. Examples of a gas generating layer or coating include volatile chemicals such as water, alcohols, and other chemicals that can be vaporized by the application of heat. The sheath provides the environmental seal and may also provide materials for additional gas generation. FIG. 2 shows an example of the use of a layer 21, enclosed in a tube 22 around a distributed charge 23, with spacers 24 supplying additional mechanical support to the tube.

Figure 3:
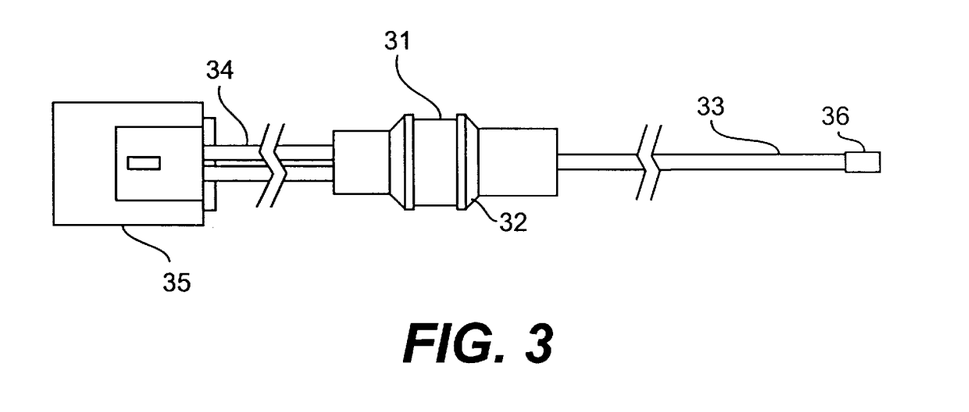
FIG. 3 is a schematic diagram of a distributed charge inflator.

FIG. 3 is a schematic diagram of the distributed charge assembly, showing the initiator 31 in its housing 32, with the distributed charge 33 sealed with an end cap 36 and lead wires 34 connecting the initiator 31 to an electrical connector 35.

The distributed charge can be a solid monolithic block of pyrotechnic materials formed into the desired configuration using binders, or the pyrotechnic material (with or without binders) can be enclosed by an exterior sheath, layer or coating for environmental protection. For example, the base DCI may be a mixture of ammonium, guadinium, and/or triaminoguadinium salts of decahydrodecaboric acid and inorganic oxidizers such as ammonium nitrate and/or potassium nitrate. Representative compositions include 5–30% by weight of the decahydrodecaborate salt and 70–90% by weight of the nitrate salt. The additional materials may be used to coat, wrap, tape, or sheath the base DCI prior to installation of the overall DCI in the inflatable system.

Figure 3A:
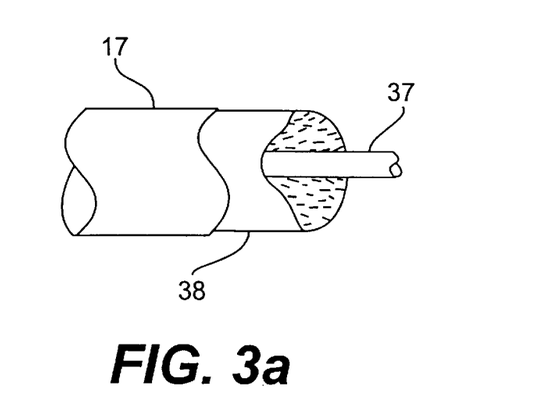
FIG. 3a is a schematic diagram of the distributed charge and its sheath.

FIG. 3a is a schematic diagram showing a distributed charge comprising a core of ignition material 37, optional gas-generating layer or coating 38, and sheath 17. Ignition material 37 is a moldable, formable, or extrudable rapidly deflagrating (burning) pyrotechnic material, such as hydroborate fuel with various nitrate oxidizers (e.g., Rapid Deflagrating Cord (RDC) manufactured by Teledyne McCormick-Selph, Inc.), of Hollister, Calif., or secondary explosives loaded into a metal sheath (e.g., Mild Detonating Fuse (MDF), also known as Low Energy Detonating Cord or LEDC, manufactured by the Ensign Bickford Company of Simsbury, Conn.).

Materials for the optional gas-generating layer or coating 38 include alkali metal azides and organic azides with polymer binders, oxidizers, and metals used as the coating sheath or binder. For example, one possible composition for a particular application might be a mixture of 20–50% by weight sodium azide, 25–35% by weight of potassium nitrate, 10–15% by weight of a fluoroelastomer binder, and 15–25% by weight of magnesium.

Energetic propellants and explosives which may be added to the base distributed charge composition or to the coating or wrapping include: butanetriol trinitrate (BTTN), pentaerythritol tetranitrate (PETN), cyclotrimethylene trinitramine (RDX), cyclotetramethylene tetranitramine (HMX), metriol trinitrate (MTN), trinitrotoluene, nitroglycerine, or inorganic oxidizers, hexanitrostilbene (HNS), dipicramid (DIPAM), or inorganic oxidizers such as potassium nitrate, with metals such as magnesium.

Polymer binders which may be used to bind the distributed charge include: fluoroelastomers, crosslinked polybutadiene rubber, crosslinked polyacrylic rubber, crosslinked polyurethane elastomers, and polyvinyl alcohol/acetate. Energetic or gas-generating polymers which may be employed in the DCI system include: glycidyl nitrate polymers, glycidyl azide polymer, polytetrazoles, polytriazoles, nitrocellulose, dinitropolystryrene, nitrated polybutadienes, and nitrated polyethers.

The environmentally-sealed sheath 17 enclosing the distributed charge may be fabricated from ductile, easily extrudable metals such as tin (preferably) or silver, antimony or copper, or plastics such as polyethylene, polyurethane elastomer or fluoroelastomers. The sheath is designed to encapsulate and protect the energetic gas-generating materials to allow uniform vaporization or burning. The sheath splits open or vaporizes following the ignition of the distributed charge. In the preferred embodiment of the invention, there should be no vent holes or other apertures in the sheath for the expanding gases to flow through into the inflatable structure. The distributed charge, supplemental propellant materials, and sheath may be formed into a wide variety of shapes and sizes to suit the specific application, as described in greater detail below.

The inflatable cushion, bag, flotation device, or other inflatable structure which the DCI is designed to deploy may be composed of fabrics such as polyester, nylon, aramid, or other fibers; or such fabrics coated with polyurethane, silicone, or other materials; bladders fabricated from polyurethane elastomers, silicone elastomers, neoprene or vinyl rubbers; or such bladder materials contained in braided fabrics such as nylon, aramid, mylar, polyester, or other thin film materials.

Pyrotechnic materials such as the RDC or MDF described above, are widely available and have been used in a wide variety of applications for 30 years or more. They are typically ignited using an attached electronic squib, which, in many applications, is actuated by a signal from an electronic crash sensor or other electronic signaling device. The present invention can be similarly actuated, using an electronic squib linked to the sensor triggering deployment of the inflatable system.

The DCI may be manufactured in various sizes and configurations, depending upon the inflation requirements of the system for which it is intended. These may range from a foil or thin film, or linear or tubular shaped charges to broad flat sheets of DCI material which may be cut, trimmed, or otherwise fitted. The DCI material, whether in a linear or sheet form, may, in cross-section, be circular, wedge-shaped, diamond-shaped, "L" shaped, or formed in any number of other configurations. Because of this flexibility and the inherent simplicity of the invention, the DCI is easier to install and less expensive to manufacture than gas generator systems currently in use.

The DCI, in contrast to the RDC-type materials currently found in the existing art, is not limited to simply propagating the rapid ignition of other materials, the burning of which then produces the quantities of gas necessary to inflate a given structure. The DCI system is a complete, autonomously-operating inflation system.

The DCI can be designed so that, depending on the pattern of distribution of the distributed charge within a given inflatable system, the rate at which different DCI sections are ignited, and the number or location of the electronic squibs used to ignite the material, variable inflation rates and effective total gas volumes may be achieved. The materials used for the DCI should be flexible and pliable, such that they will not fracture or flow under normal operating conditions.

EXAMPLES

The following examples of implementations of the present invention serve to illustrate the application of the present invention to a side impact head strike protection system (such as the system described in U.S. Pat. No. 5,322,322), to a door-mounted side air bag, and in an internally-coated air bag, respectively.

EXAMPLE 1

Side Impact Head Strike Protection

Figure 4A:
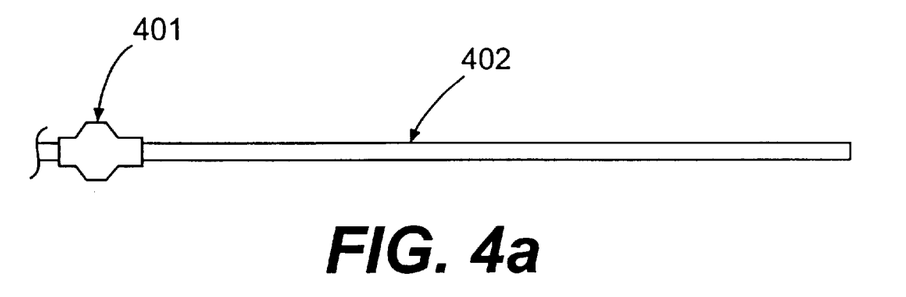
FIGS. 4a–4m are schematic diagrams of the implementation of the present invention described in Example 1.
Figure 4B:
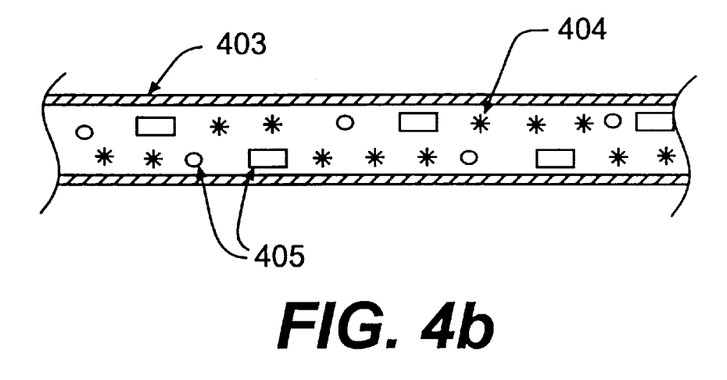
Figure 4C:
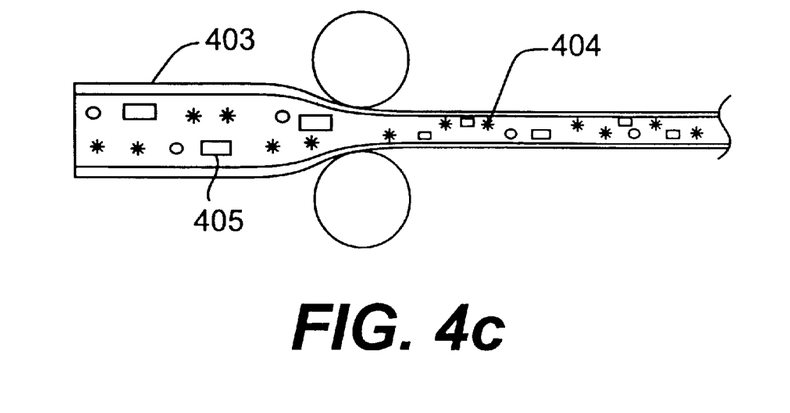
Figure 4D:
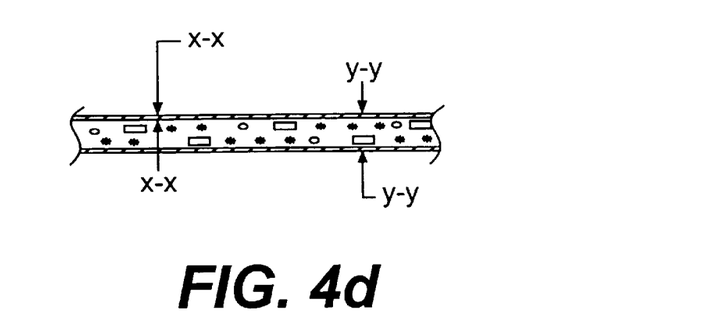
Figure 4E:
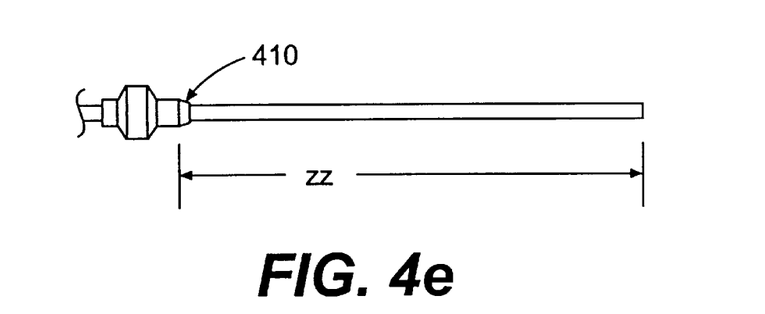
Figure 4F:
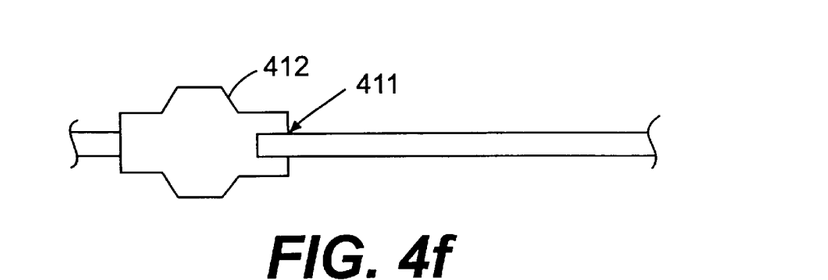
Figure 4G:
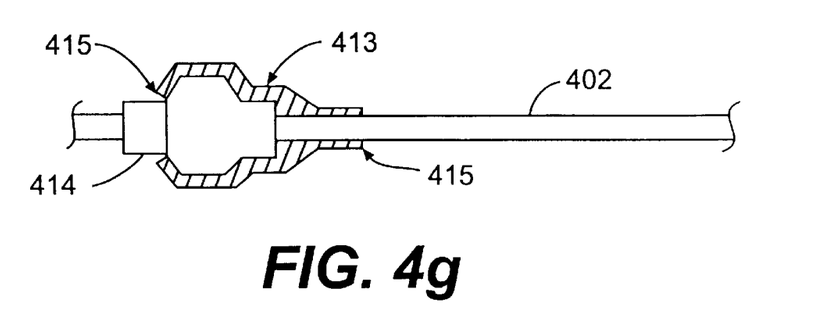

This example is illustrated in FIGS. 4a–4m. As shown in FIG. 4a, an electronic squib 401, such as those used as initiators for automotive air bags by Special Devices, Inc. of Mesa, Ariz., is mated to a distributed charge 402, e.g., a modified Rapid Deflagrating Cord (RDC) manufactured by Teledyne McCormick Selph in Hollister, Calif. The distributed charge is sealed to the electronic squib, to prevent moisture or other contamination from entering into the assembly between the charge and the electronic squib. As shown in FIG. 4b, the modified RDC contains, in a tin sheath 403, 4 to 7 grains per foot of Rapid Deflagrating Material (RDM) 404 and 7 to 14 grains per foot of automotive air bag propellant 405, such as sodium azide propellant manufactured by TRW in Mesa, Ariz. The RDM and the sodium azide propellant is consolidated in the tin sheath by drawing the assembly through rollers, as shown in FIG. 4c. The modified RDC is drawn to a diameter y—y of $1/16"$ to $1/8"$ and to a wall thickness x—x for the tin sheath of 0.01" to 0.02", as shown in FIG. 4d. The distributed charge is cut to the proper length zz for the application (in this case about 35"). The end of the distributed charge is mated to the electronic squib using an adhesive and potted using potting compound 410, as shown in FIG. 4e. The electronic squib or other initiator could alternatively include a mechanical fixture 411, shown in FIG. 4f, such that the distributed charge could be attached to the initiator 412 by crimping, welding, soldering or potting so that the distributed charge is sealed from moisture or other contaminants. Alternatively, instead of providing an initiator with the mechanical fixture, a housing 413 could be used to mate the distributed charge 402 to a standard initiator 414 using sealing 415, as shown in FIG. 4g.

Figure 4H:
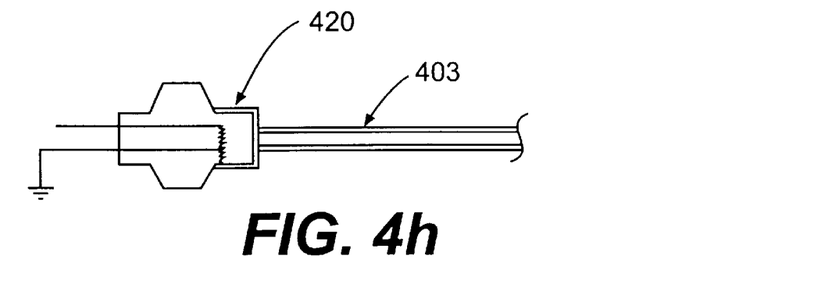
Figure 4I:
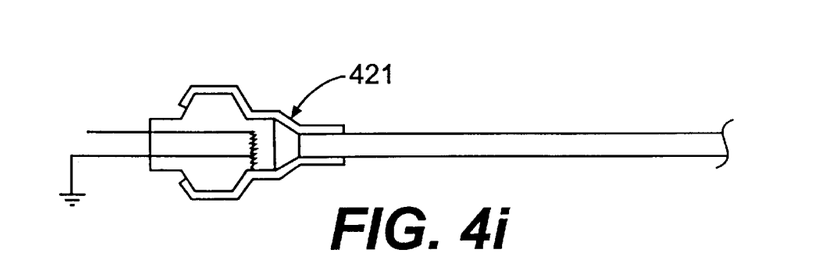
Figure 4J:
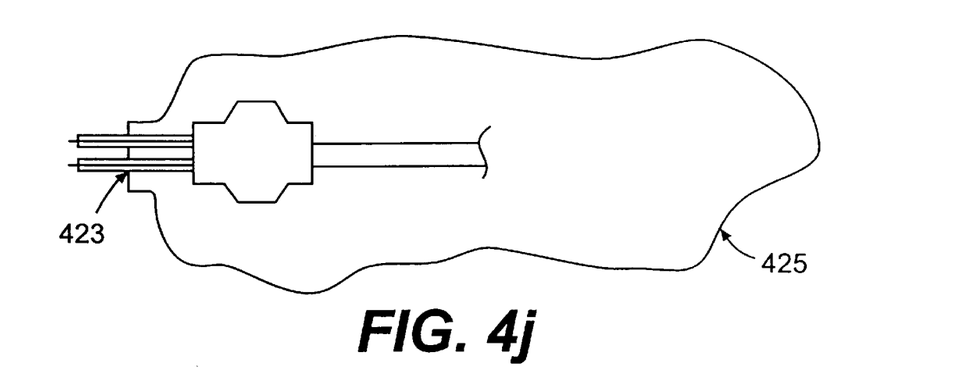
Figure 4K:
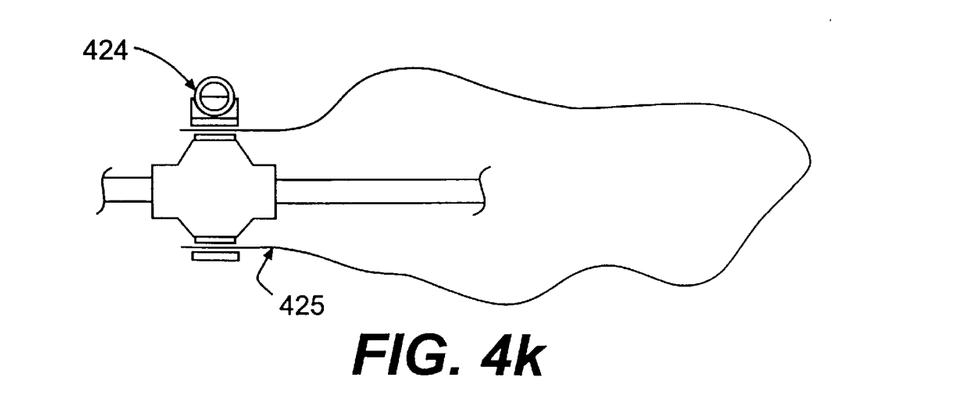

The initiator cup 420 is electrically grounded to the tin sheath 403, and both are grounded (e.g., to the car chassis) via the electrical connection to the sensing device, as shown in FIG. 4h. A metal housing 421 can also be used to ensure a proper ground between the initiator and the tin sheath, as shown in FIG. 4i. The DCI is placed inside the inflatable component and sealed so that the pins of the electronic squib or other initiator are exposed (see FIG. 4j, showing exposed wires 423). Alternatively, the DCI can be sealed inside the inflatable component using, e.g., a band clamp (see FIG. 4k, showing band clamp 424).

Figure 4L:
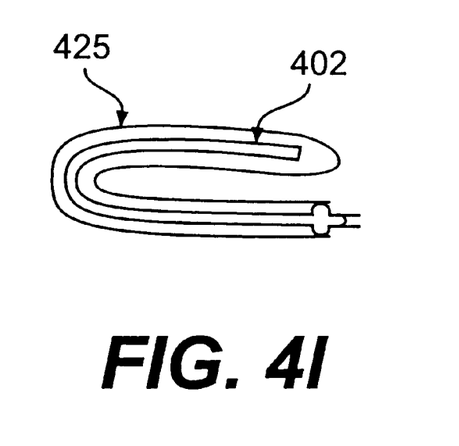
Figure 4M:
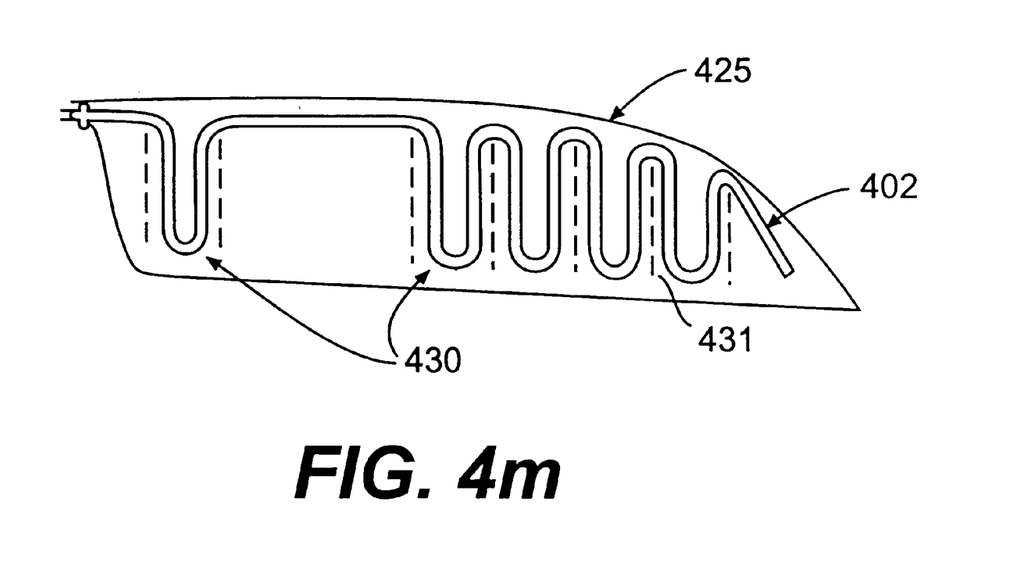

The distributed charge 402 can be inserted into a folded inflatable component 425, as shown in FIG. 4l, or it could simply be folded within the air bag. The distributed charge 402 could also be woven or placed in chambers 430 or baffles 431 that would normally hinder inflation (because of the chambers or baffles are at right angles to the gas flow), as shown in FIG. 4m.

EXAMPLE 2
Door (or Seat)-Mounted Side Air Bag

Figure 5:
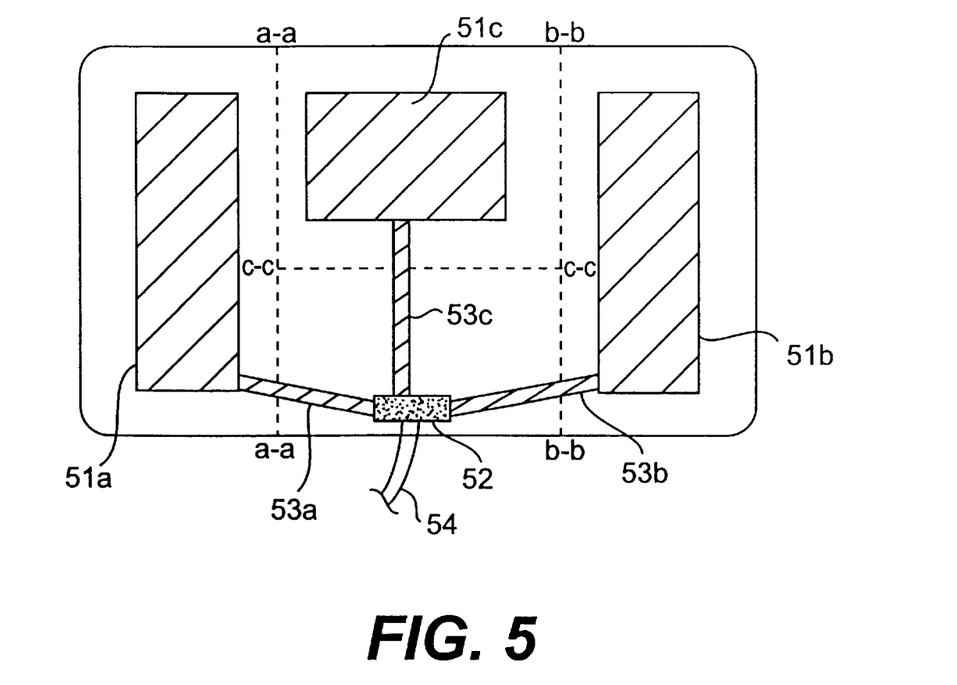
FIG. 5 is a schematic diagram of the laminated distributed charge air bag described in Example 2.

This air bag system uses a laminated distributed charge, shown in FIG. 5, in which three distributed charge laminates 51a, 51b and 51c, are laminated into the left, right and center sections of the air bag. The charge initiator 52, e.g., a conventional automotive electronic squib, is connected by wires 54 to a crash sensor or other activator. Charge strips 53a, 53b and 53c (e.g., strips of RDM) lead from initiator 52 to each of the distributed laminated charges 51a, 51b and 51c. The air bag is folded in order along lines a—a, b—b and c—c as shown in FIG. 5.

The burn rate, length and characteristics of RDM strips 53a, 53b and 53c are selected so as to control the sequential deployment of the air bag. For example, if all three charge strips have approximately the same lenghth, strip 53c could have fastest burn rate, so that charge 51c inflates the central panel of the air bag first. Strip 53b could have the next fastest burn rate, so that charge 51b inflates the right-hand panel of the air bag next. Strip 53a could have the slowest burn rate, so that charge 51a inflates the left hand panel of the air bag last. Alternatively, the timing could be controlled using charge strips with the same burn rate, but with different lengths. Thus, using charge strips with the same burn rate, charge strip 53c would be the shortest charge strip, charge strip 53b would be the next shortest, and charge strip 53a would be the longest, so that charges 51c, 51b and 51a would ignite in sequence.

Figure 5A:
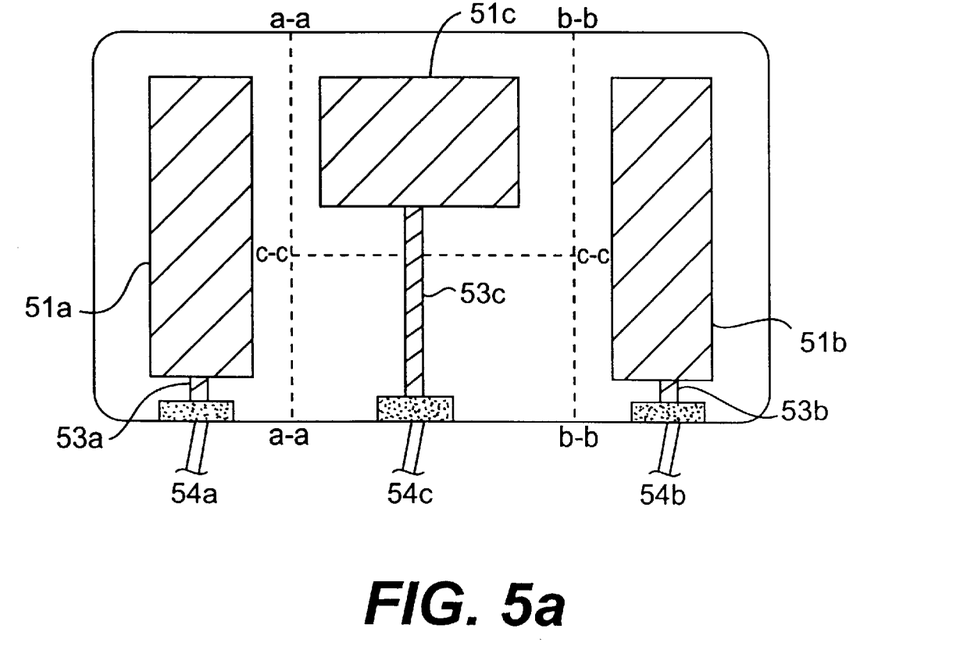

One alternative to the implementation shown in FIG. 5 is the use of a number of initiators (instead of just one initiator), as shown in FIG. 5a. In that case, each of the section charges 51a, 51b and 51c, respectively, has its own separate and independent initiator 54a, 54b and 54c, respectively, that could be initiated in a desired sequence by sending the proper sequence of electric signals to the initiators along wires 54a, 54b and 54c, respectively, to start ignition of charge strips 53a, 53b and 53c, respectively. Also, one initiator may initiate deployment of certain sections of the air bag, and other initiators may initiate deployment of other sections of the air bag, using a combination of timing of the electric signals and the burn rate of the charge strips to obtain the proper inflation sequence. Furthermore, electrical signals in addition to electrical signals from the activator (e.g., electrical signals indicating the position of the vehicle seat), may determine the deployment sequence. Alternatively, a sheet of charge can be used instead of a strip, with the dimensions and geometry of the sheet selected such that the section charges are ignited in the desired sequence.

The deployment of other air bags or other inflatable components can be similarly initiated and controlled in a desired time sequence, so as to design an inflatable system which deploys in the most effective sequence at the correct times, in response to the signal from the activator and according to various inputs such as the crash velocity, the occupant size, or the position of the seat or of the occupant.

EXAMPLE 3
Internally-Coated Air Bag

Figure 6:
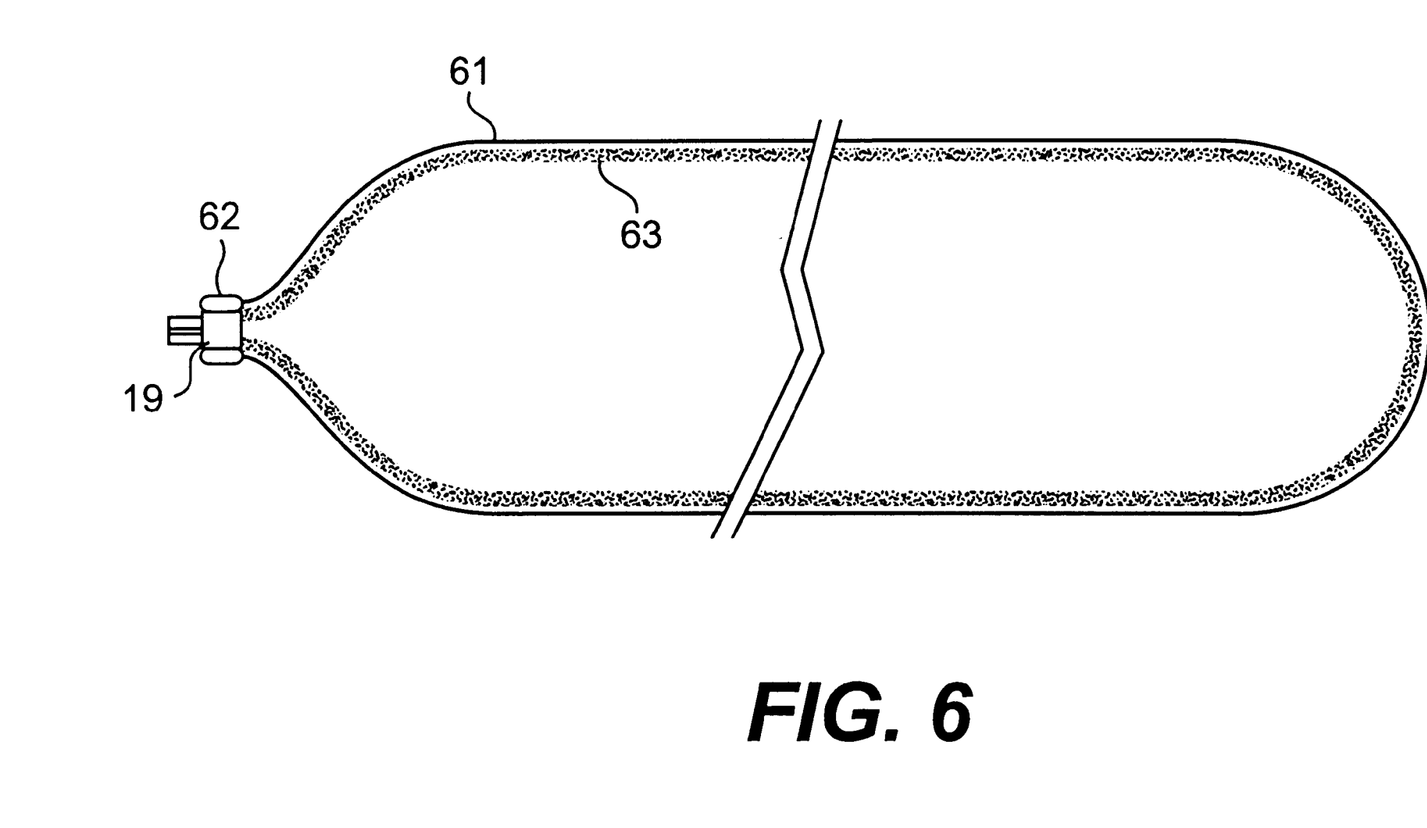
FIG. 6 is a schematic diagram of the internally-coated air bag described in Example 3.

An alternate configuration is shown in FIG. 6. The air bag fabric 61 is internally coated with gas generating material 63. The composition of that gas generating material is the same as the composition of the DCI described above, except that no external sheath is used. The gas generating material can be applied to the fabric either prior to or after the air bag is assembled. The initiator 19 will provided ignition of gas generating material 63. Clamp 62 seals the air bag fabric to initiator 19.

The present invention has been described in detail with respect to preferred embodiments of the invention, and by describing specific examples of the use of the invention. However, the scope of the invention is not limited to the specific embodiments and examples described in detail herein, but is to be defined only by the appended claims.

What we claim is:

1. An inflatable system comprising:
   (a) an inflatable component;
   (b) a charge distributed within the inflatable component for generating inflating gas;
   (c) a sheath enclosing the charge within the inflatable component;
   (d) an initiator, in contact with the charge, for igniting the charge; and
   (e) an activator electrically connected to the initiator for initiating deployment of the inflatable component,
   wherein the initiator ignites in response to a signal from the activator, igniting the charge and generating inflating gas which inflates the inflatable component.

2. The inflatable system of claim 1, wherein the charge contains additional gas generating materials which increase the quantities of gas generated.

3. The inflatable system of claim 1, further comprising a layer of supplemental gas-generating material on the surface of the charge.

4. The inflatable system of claim 3, wherein the layer of supplemental gas-generating material comprises volatile chemicals.

5. The inflatable system of claim 1, wherein the sheath also comprises gas-generating materials.

6. The inflatable system of claim 1, wherein the charge has a linear configuration.

7. The inflatable system of claim 1, wherein the charge has a tubular configuration.

8. The inflatable system of claim 1, wherein the charge has a flat configuration.

9. The inflatable system of claim 1, wherein the charge comprises hydroborate fuels and nitrate oxidizers.

10. The inflatable system of claim 1, wherein the charge comprises secondary explosives.

11. The inflatable system of claim 1, wherein the charge is distributed as a coating on at least one interior surface of the inflatable component.

12. An inflatable system comprising:
   (a) an inflatable component;
   (b) a charge distributed within the inflatable component;
   (c) an initiator in electrical contact with an activator, said initiator being positioned such that upon ignition of the initiator in response to a signal received from the activator, the initiator initiates ignition of the distributed charge, generating inflating gas and thus inflating the inflatable component.

13. The inflatable system of claim 12, wherein the distributed charge is a mixture of at least two materials.

14. The inflatable system of claim 13, wherein one of the materials is selected from the group consisting of the ammonium, guadinium and triaminoguadinium salts of decahydrodecaboric acid.

15. The inflatable system of claim 13, wherein one of the materials is potassium nitrate.

16. The inflatable system of claim 12, wherein the distributed charge comprises two or more materials selected from the group consisting of alkali metal azides, organic azides with polymer binders, and oxidizers.

17. The inflatable system of claim 12, wherein the distributed charge is coated on at least one internal surface of the inflatable component.

18. The inflatable system of claim 12, wherein the inflatable component is an air bag comprising a first plurality of sections, and wherein the distributed charge is distributed such that there is a section charge in each of a second plurality of sections, wherein the second plurality is equal to or less than the first plurality.

19. The inflatable system of claim 18, wherein the initiator is connected to each section charge by a section charge strip.

20. The inflatable system of claim 19, wherein the section charge strips have different burn rates, such that the section charges are ignited sequentially.

21. The inflatable system of claim 12, wherein the initiator comprises an electronic squib.

22. An inflatable system comprising:
    (a) an inflatable component;
    (b) a charge distributed within the inflatable component for generating inflating gas;
    (c) a layer of additional gas-generating material disposed around the inflatable component;
    (d) a sheath enclosing the layer of additional gas-generating material and the charge within the inflatable component;
    (e) an initiator, in contact with the charge, for igniting the charge; and
    (f) an initiating device electrically connected to the initiator for initiating deployment of the inflatable component,
    wherein the initiator ignites in response to a signal from the initiating device, igniting the charge and generating inflating gas which inflates the inflatable component.

23. The inflatable system of claim 22, wherein the distributed charge is a monolithic block of pyrotechnic materials.

24. The inflatable system of claim 23, wherein the distributed charge comprises at least one material selected from the group consisting of the ammonium, guadinium and triaminoguadinium salts of decahydrodecaboric acid.

25. The inflatable system of claim 24, wherein the charge further comprises at least one material selected from the group consisting of sodium azide, potassium nitrate and magnesium.

26. The inflatable system of claim 22, wherein the charge comprises a polymer binder.

27. The inflatable system of claim 26, wherein the polymer binder is selected from the group consisting of flouroelastometers, crosslinked polybutadiene rubber, crosslinked polyacrylic rubber, crosslinked polyurethane elastometers and polyvinyl alcohol/acetate.

28. The inflatable system of claim 22, wherein the charge comprises an energetic gas-generating polymer.

29. The inflatable system of claim 28, wherein the energetic gas-generating polymer is selected from the group consisting of glycidyl nitrate polymers, glycidyl azide polymer, polytetrazoles, polytriazoles, nitrocellulose, dinitropolystyrene, nitrated polybutadienes, and nitrated polyethers.

30. The inflatable system of claim 22, wherein the charge comprises an energetic propellant.

31. The inflatable system of claim 30, wherein the energetic propellant is selected from the group consisting of butanetriol trinitrate, pentaerythritol tetranitrate, cyclotrimethylene trinitramine, cyclotetramethylene tetranitramine, metriol trinitrate, trinitrotoluene, nitroglycerine.

32. The inflatable system of claim 30, wherein the energetic propellant is selected from the group consisting of hexanitrostilbene and dipicramid.

33. The inflatable system of claim 30, wherein the energetic propellant is a mixture of a metal and an inorganic oxidizer.

34. An inflatable system comprising:
    (a) an inflatable component comprising a first plurality of sections;
    (b) a charge distributed as laminated section charges within a second plurality of sections of the inflatable component, for generating inflating gas to inflate the inflatable component, wherein the second plurality is equal to or less than the first plurality;
    (c) at least one initiator, in contact with the section charges, for igniting the section charges, wherein each section charge is in contact with at least one of the at least one initiators; and
    (d) an activator electrically connected to each of the at least one initiators for initiating deployment of the inflatable component,
    wherein each of the at least one initiators ignites in response to at least one signal from the activator, igniting the charge and generating inflating gas which inflates the inflatable component.

35. The inflatable system of claim 34, comprising one initiator in contact with each of the section charges, wherein the contact from the initiator to the section charges comprises charge strips.

36. The inflatable system of claim 35, wherein the charge strips are designed to initiate ignition of the section charges sequentially.

37. The inflatable system of claim 34, wherein the at least one initiator is a plurality of initiators, and each section charge is in contact with an initiator assigned to that section charge.

38. The inflatable system of claim 37, wherein each initiator is ignited independently of the other initiators.

39. The inflatable system of claim 37, wherein the initiators are ignited according to a desired sequence for the deployment of the sections of the inflatable component.

40. The inflatable system of claim 12, wherein the charge distributed within the inflatable component is enclosed within a sheath.

41. The inflatable system of claim 40, wherein the charge has one of a tubular, linear and flat configuration.

42. The inflatable system of claim 40, wherein the charge comprises secondary explosives.

43. The inflatable system of claim 40, wherein the charge comprises hydroborate fuels and nitrate oxidizers.

44. The inflatable system of claim 12, wherein the charge comprises hydroborate fuels and nitrate oxidizers.

45. The inflatable system of claim 22, wherein the charge comprises hydroborate fuels and nitrate oxidizers.

46. The inflatable system of claim 34, wherein the charge comprises hydroborate fuels and nitrate oxidizers.

47. The inflatable system of claim 34, wherein the laminated section charges are enclosed in a sheath.

48. The inflatable system of claim 47, wherein the charge comprises hydroborate fuels and nitrate oxidizers.

* * * * *